(12) United States Patent
Goncze

(10) Patent No.: US 6,286,533 B1
(45) Date of Patent: Sep. 11, 2001

(54) METERING VALVE ASSEMBLY

(75) Inventor: Zoltan Goncze, Northbrook, IL (US)

(73) Assignee: Mark Controls Corporation, Skokie, IL (US)

( * ) Notice: Subject to any disclaimer, the term of this patent is extended or adjusted under 35 U.S.C. 154(b) by 0 days.

(21) Appl. No.: 08/934,255

(22) Filed: Sep. 19, 1997

(51) Int. Cl.[7] .......................... F16K 21/04; F16K 21/16; F16K 31/14; F16K 31/48
(52) U.S. Cl. .................. 137/2; 251/36; 251/46; 251/47; 251/51; 251/52
(58) Field of Search .................. 251/33, 35, 36, 251/39, 45, 46, 47, 50, 51, 52, 53, 54, 55

(56) References Cited

U.S. PATENT DOCUMENTS

| | | | |
|---|---|---|---|
| 787,287 | * 4/1905 | Gardner | 251/36 |
| 871,859 | * 11/1907 | Brooks | 251/36 |
| 1,066,350 | * 7/1913 | Watrous | 251/36 |
| 1,162,957 | * 12/1915 | Watrous | 251/36 |
| 1,254,869 | * 1/1918 | Watrous | 251/36 |
| 1,327,000 | 1/1920 | Watrous | 251/51 |
| 1,598,166 | * 8/1926 | Stewart | 251/36 |
| 1,658,000 | 1/1928 | Langdon | 251/39 |
| 1,934,545 | 11/1933 | Langdon | 251/39 |
| 2,613,688 | 10/1952 | Knaggs | 251/39 |
| 2,710,736 | 6/1955 | Miller | 251/51 |
| 3,269,689 | 8/1966 | Lee | 251/52 |
| 3,495,619 | 2/1970 | Iizumi | 137/489.5 |
| 3,588,923 | 6/1971 | Haglund et al. | 4/362 |
| 3,842,857 | 10/1974 | McCornack | 137/242 |
| 3,933,337 | 1/1976 | Morris et al. | 251/54 |
| 4,210,309 | 7/1980 | Grenier | 251/35 |
| 4,424,952 | * 1/1984 | Thomson et al. | 251/54 |
| 4,520,992 | 6/1985 | Sheffer | 251/48 |
| 4,529,002 | * 7/1985 | Jacobson | 251/46 |
| 4,570,899 | * 2/1986 | Kingham | 251/51 |
| 4,784,368 | 11/1988 | Koch et al. | 251/51 |
| 4,832,310 | 5/1989 | Nestich | 251/36 |
| 4,899,778 | 2/1990 | Laube | 137/242 |
| 4,991,819 | 2/1991 | Laube | 251/35 |
| 5,295,654 | 3/1994 | Laube | 251/35 |
| 5,427,351 | 6/1995 | Korfgen et al. | 251/39 |
| 5,451,030 | 9/1995 | Reglebrugge et al. | 251/51 |

* cited by examiner

Primary Examiner—George L. Walton
(74) Attorney, Agent, or Firm—Brinks Hofer Gilson & Lione

(57) ABSTRACT

A metering valve assembly for use in sanitary applications and method of use is disclosed. The metering valve assembly has a relief valve hydraulically controlling a pilot valve covering a water supply inlet. The relief valve is controllably closed by a damping mechanism substantially independently of typical variations in water supply temperature and pressure.

21 Claims, 4 Drawing Sheets

METERING VALVE ASSEMBLY

BACKGROUND OF THE INVENTION

The present invention relates to a metering valve for use in sanitary installations. More particularly, the present invention relates to a self-closing valve assembly with reduced operating effort and improved ability to maintain a timed flow of water despite variations in water supply pressure and temperature.

Metering valves for lavatory applications are generally used in commercial or public buildings. Metering valves are intended to provide a flow of water for a predetermined period of time when they are actuated. Typically, a metering valve is mounted on, for example, a faucet in a public restroom and actuated by pressing down on a handle. When the handle is released, water is supposed to flow for a preset time to allow the user to wash up. After the preset time, the metering valve completely shuts off the water.

Several existing metering valves use a washer compression valve as the main water flow control valve. Washer compression valves use the inlet water pressure to assist in sealing. The force of the inlet water pressure must then be overcome to open the valve. Because of this direct dependence on inlet water pressure, these types of metering valves are often very sensitive to changes in water pressure and are thus prone to large swings in operating effort necessary to begin water flow as well as swings in cycle time once the valve is actuated. The operating effort necessary to actuate a metering valve used in public buildings is preferably five pounds or less under the Americans with Disabilities Act (ADA).

In order to control the cycle time of the metering valve, various valve configurations have been attempted in the industry. U.S. Pat. No. 4,899,778 discloses a metering valve that uses handle stroke and a very small diameter pilot hole to control cycle time. This design can lead to cycle times that are very dependent upon inlet water supply pressure. Also, the small pilot hole can be easily clogged. The metering valve disclosed in U.S. Pat. No. 3,933,337 discloses another approach to maintaining a desired cycle time through the use of a sealed damping chamber containing a special timing fluid. This design can be disadvantageous because small amounts of the timing fluid may be lost with each cycle. Also, any type of timing fluid with a higher viscosity than water will increase operating effort and be sensitive to water temperature changes.

Accordingly, there is a need for a metering valve with an operating effort that is less sensitive to water supply pressure and temperature, a cycle time that is not significantly affected by water supply pressure and temperature, and improved resistance to mineral or particulate contamination in the water supply.

SUMMARY OF THE INVENTION

According to a first aspect of the present invention, a metering valve for use in a lavatory is provided having a relief valve assembly operatively connected to a handle. The relief valve assembly includes a damping mechanism for controllably closing the relief valve assembly after the handle receives an actuating force opening the relief valve. A pilot valve assembly is mounted over a water supply inlet independently of the relief valve assembly and the handle. The pilot valve assembly is hydraulically controllable by the relief valve to open or close off a flow of water from the water supply inlet. Preferably, the damping assembly of the metering valve consists of a damping member and biasing member positioned in a damping chamber adjacent to the relief valve wherein the spring constant of the biasing member and a water channel in the damping chamber control the cycle time of the metering valve substantially independently of the water pressure or temperature of the water supply.

According to another aspect of the present invention, a method of actuating a metering valve includes the step of providing a metering valve having a relief valve operatively connected to a handle and a pilot valve assembly covering a water supply inlet. The pilot valve assembly is movably mounted inside the metering valve independently of the handle and relief valve. The pilot valve has a first side covering the water supply inlet and a second side opposite the first side, the water supply inlet providing water at a predetermined water pressure. A downforce is provided on the handle that is transmitted from the handle to the relief valve. The relief valve opens when the downforce reaches a predetermined threshold. Water pressure on the second side of the pilot valve is then reduced by channeling water through the opened relief valve. The pilot valve is automatically opened with the force of the water supply pressure when the force of the reduced water pressure against the second side of the pilot valve becomes less than the force of the water supply pressure against the first side of the pilot valve. The relief valve is closed at a rate substantially independent of the water supply pressure and causes an increased water pressure on the second side of the pilot valve. The pilot valve then quickly closes in response to the increased water pressure that builds up on the second side of the pilot valve.

DETAILED DESCRIPTION OF THE PRESENTLY PREFERRED EMBODIMENTS

Figure 1:
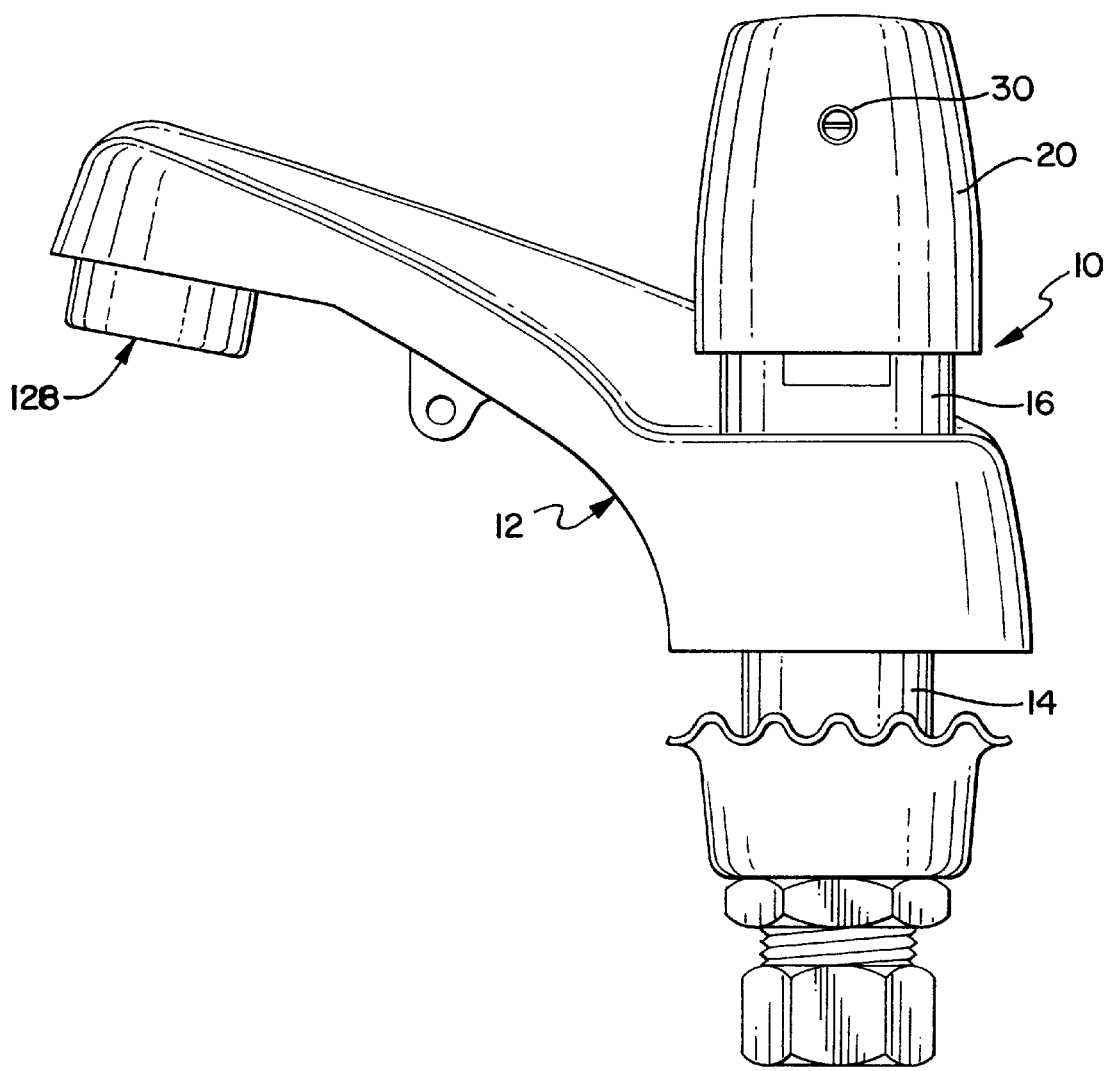
FIG. 1 is a side view of a presently preferred embodiment of the metering valve mounted on a faucet.

FIG. 1 illustrates a preferred embodiment of the metering valve 10 of the present invention mounted on a faucet 12. The metering valve 10 may be used in public or commercial lavatories for faucets and toilets. Preferably, the metering valve is designed to be interchangeable with standard lavatory cartridges.

Figure 2:
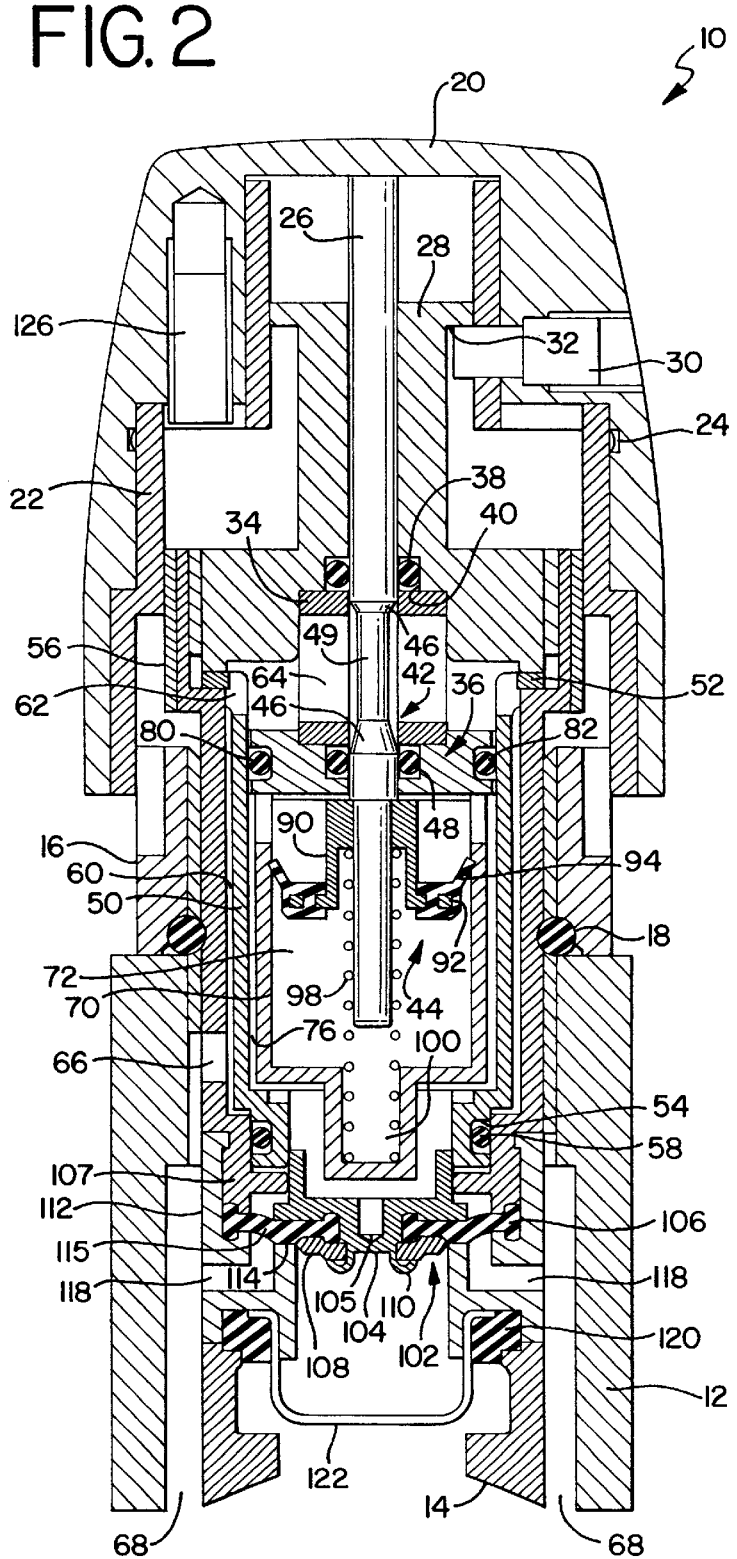
FIG. 2 is a cross-sectional view of the metering valve of FIG. 1.

As shown in FIG. 2, the metering valve removably fits into a faucet 12 over a water inlet 14. A cartridge nut 16 firmly seals the metering valve against the faucet 12 with an O-ring 18. The metering valve 10 is covered by a handle 20 that attaches to a handle insert 22 via snap fit connections 24. In one preferred embodiment, the handle 20 may be constructed of a metal such as a chrome plated brass and the handle insert 22 may be a plastic suitable for injection molding.

The handle 20 rests against a central stem 26 extending longitudinally down the center of the metering valve 10. The stem 26 passes through and is guided by a damping nut 28 mounted beneath the handle insert 22. A handle screw 30 extends through the handle 20 and handle insert 22 from one side of the metering valve. The handle screw 30 rests under a lip 32 on the damping nut 28 to securely attach the handle 20 and handle insert 22 to the rest of the metering valve 10. A seal spacer 34 is coaxially disposed about the stem 26 and spaces the damping nut 28 away from the upper valve assembly 36. An O-ring 38 positioned against the top of the seal spacer 34 and an annular recessed region 40 of the damping nut 28 forms a substantially water tight seal around the stem 26.

The upper valve assembly 36 contains a relief valve 42 and damping mechanism 44. The relief valve 42 includes a reduced diameter section 49 of the stem 26 and a relief valve seal 48, which may be an internally lubricated O-ring or Quad-ring®. The reduced diameter section 49 of the stem is positioned between two tapered portions 46 on the stem 26. The upper valve assembly 36 is contained inside a cylindrical outer sleeve 50 that has a flange 52 around a first end and an annular recessed region 54 around the other end. The outer sleeve 50 is mounted inside a cartridge cage 56 that is externally threaded and screwed into the faucet 12. The cartridge nut 16 has complementary internal threads that cooperate with the threads on the cartridge cage to hold the metering valve assembly 10 to the faucet 12. The cartridge cage 56, when the metering valve 10 is installed in the faucet 12, compresses the outer bead 107 of the diaphragm 106 in the lower valve assembly 102. This allows for a larger diaphragm to be used than if the diaphragm bead 107 was already mounted internally and pre-compressed before installation.

The flange 52 of the outer sleeve 50 creates a pressure tight seal that prevents water leakage between the cartridge cage 56 and the damping nut 28 when the damping nut 28 is threaded into the cartridge cage 56. The opposite end of the outer sleeve 50 forms a seal against the cartridge cage 56 with an O-ring 58 positioned in the annular recessed region 54. The outer sleeve 50 is radially spaced away from the cartridge cage 56 and the gap between the outer sleeve and cartridge cage defines an outer water passage 60. At least one opening 62 in the circumference of the outer sleeve near the flange connects water in the relief chamber 64 to the outer water passage 60. At least one opening 66 in the cartridge cage 56 connects the outer water passage 60 to the water outlet 68 in the faucet 12.

Figure 3:
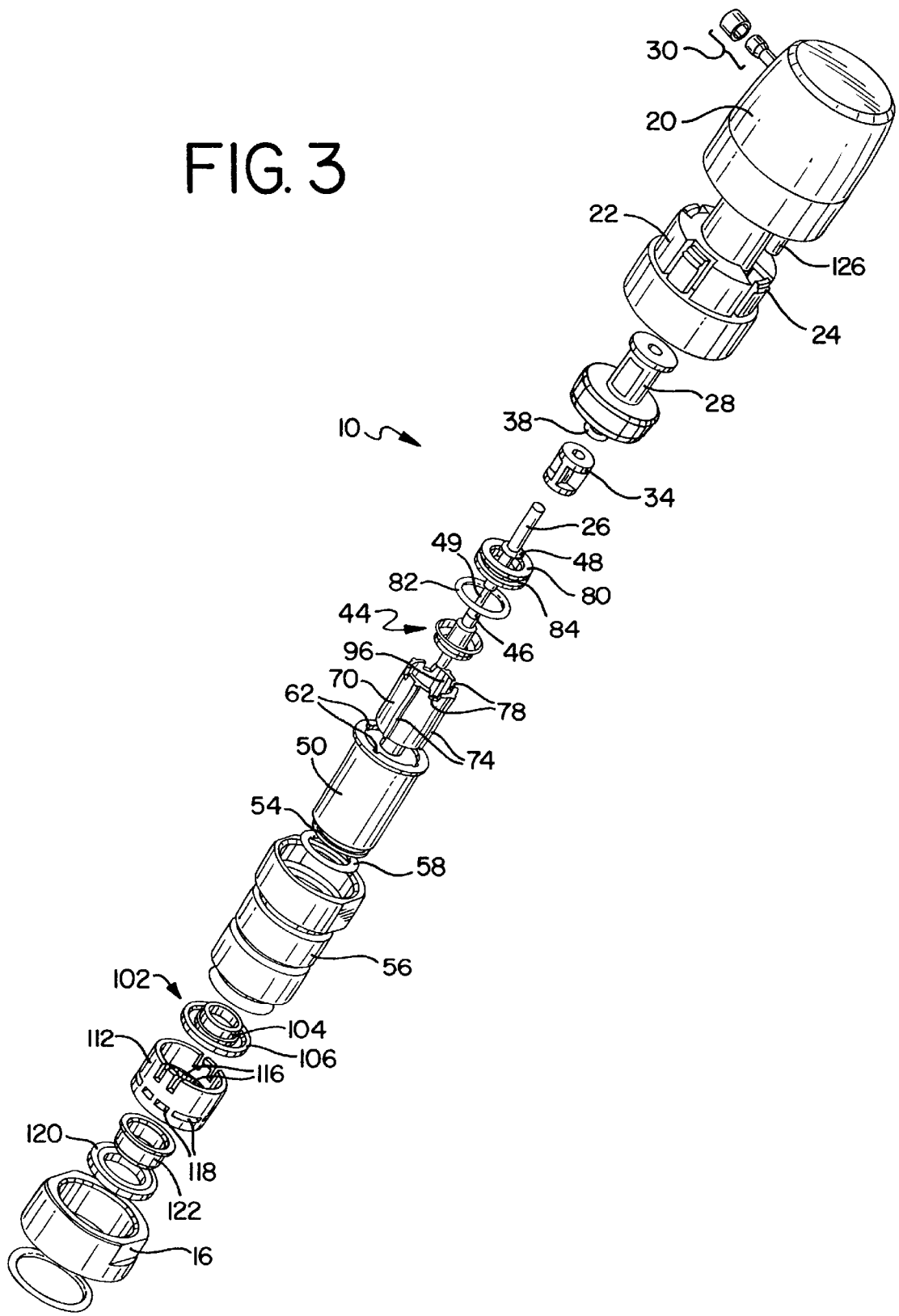
FIG. 3 is an exploded perspective view of the metering valve of FIG. 1.

Coaxially positioned within the outer sleeve 50 is an inner sleeve 70 that houses a damping chamber 72. The inner sleeve 70 is radially spaced apart from the outer sleeve by a plurality of longitudinal spacers 74 (FIG. 3). An inner water passage 76 is defined by the gap between the inner and outer sleeves 70, 50. At least one opening 78 in the inner sleeve allows water in the inner water passage to communicate with water in the damping chamber 72. The upper end of the damping chamber 72 is bounded by an O-ring cage 80. The O-ring cage 80 is preferably an annular disk positioned against the inner circumference of the outer sleeve below the opening 62 in the outer sleeve. An outer O-ring 82 fits in a retaining groove 84 along the outer circumference of the O-ring cage 80. As described above, the relief valve seal 48 is mounted along an inner O-ring retaining groove 86 and forms a seal with the stem 26.

The stem 26, slidably positioned in the damping nut 28, extends into the damping chamber 72 below the O-ring cage 80. The damping mechanism 44 is fixedly positioned on a portion of the stem 26 within the damping chamber 72. Preferably, the damping mechanism 44 comprises a rigid insert 90, which may be made from a metal material, coaxially mounted on the stem and a flexible member 92 attached to the outer diameter of the rigid insert 90. The flexible member 92 may be a rubber V-cup having an angled rim 94 that contacts the inside of the inner sleeve 70. The angled rim 94 is preferably flexible enough to allow any particulate matter in the water to pass through a channel 96 on the inside of the inner sleeve 70. The channel 96 is a groove along the inner diameter of the inner sleeve 70 running longitudinally from the open end of the inner sleeve to the closed bottom.

A biasing member 98 forces the stem 26 against the handle 20 of the metering valve 10. As shown in FIG. 2, the biasing member 98 may be a spring positioned between the damping mechanism 44 and a contaminant chamber 100 in the closed bottom portion of the inner sleeve 70. The spring biases the relief valve in a closed position. The spring is configured to compress upon application of a downforce on the handle. The spring, in cooperation with the damping mechanism 44 and channel 96, is designed to determine the cycle time of the metering valve and the operating effort (downforce) necessary to actuate the metering valve. The spring may be a torsion spring or a clock spring. In alternative embodiments, the biasing member may be a diaphragm or expansion spring designed to expand upon application of a downforce on the handle and retract to an initial position to hold the relief valve closed.

A lower valve assembly 102 controls the flow of water from the water supply inlet to the water outlet. The lower valve assembly 102 is preferably hydraulically controlled by the upper valve assembly and so does not come in direct contact with the relief valve or stem. In a preferred embodiment, the lower valve assembly 102 is a fast acting pilot valve movably responsive to a pressure differential between the water supply at the water inlet 14 and the water above the pilot valve.

The pilot valve has a body 104 mounted on a flexible diaphragm 106. The body 104 includes a pilot hole 105 that allows a small flow of water to pass through the body 104. The diaphragm 106 is an annulus of rubber with the inner diameter held by a diaphragm shim 108 against the diaphragm cage 110 portion of the body 104. The bead 107 on the outer diameter of the diaphragm 106 is held between the lower end of the cartridge cage 56 and a diaphragm seat insert 112. The diaphragm seat insert 112 includes an annular diaphragm seat 114 for receiving and sealing against the seal 115 on the diaphragm 106 when the lower valve assembly 102 closes the water flow from the water supply. A plurality of ribs 116 (FIG. 3) support the diaphragm 106 when the valve 102 is closed and the diaphragm is sealed against the diaphragm seat. Between each of the ribs are flow channels 118 that connect the water supply from the inlet 14 to the outlet 68 when the valve 102 is open. A gasket 120 holds a filter 122 against the bottom of the diaphragm seat insert 112. In one embodiment, the pilot hole 105 has a diameter of 0.02 inches, the filter is designed to filter particles in the water greater than 0.009 inches in diameter, and the diaphragm 106 is a made from a rubber such as EPDM having a 50 durometer hardness.

Figure 4:
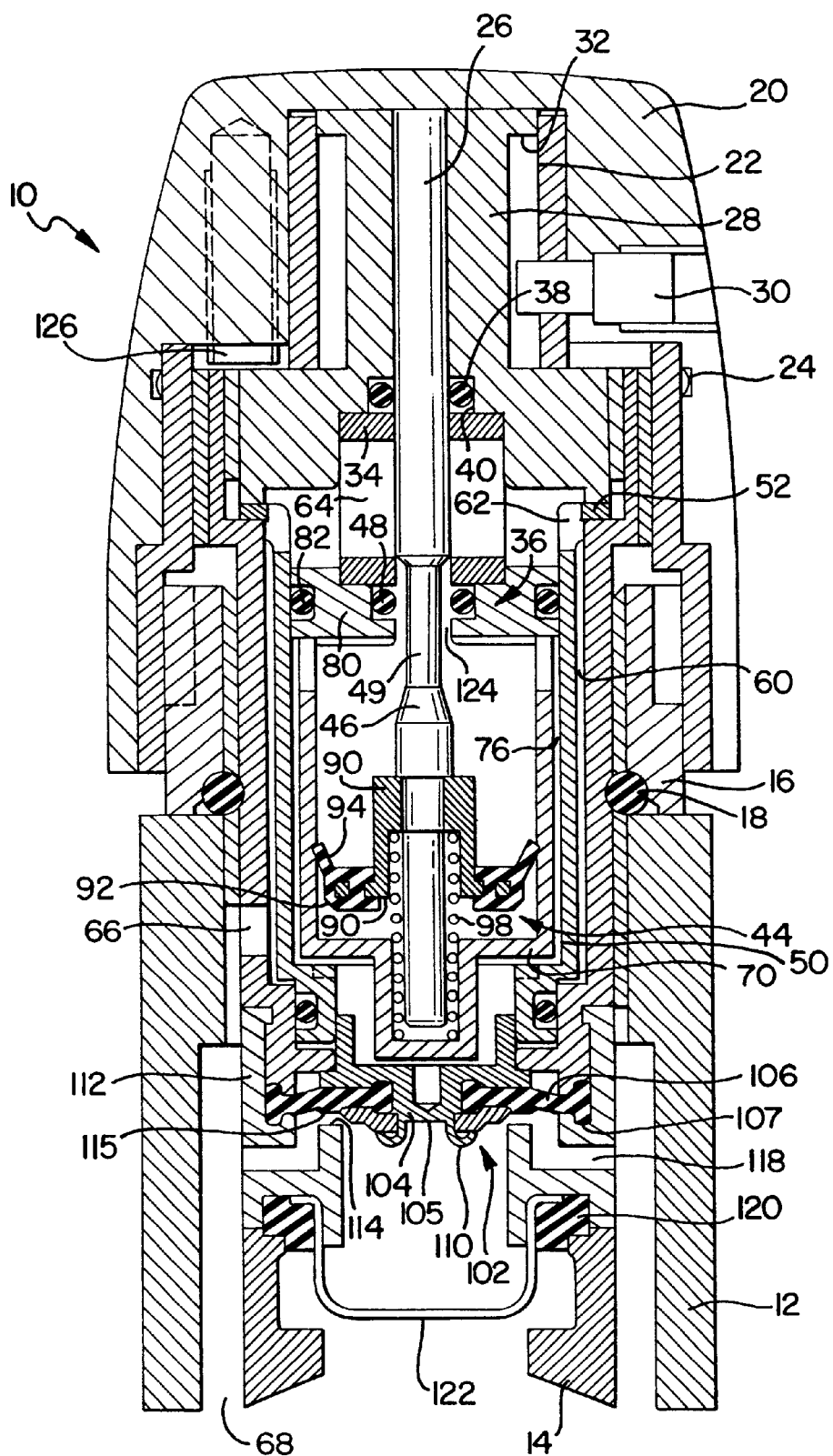
FIG. 4 is a cross-sectional view of the metering valve of FIG. 1 showing the relief valve and pilot valve in an open position.

Referring to FIGS. 1–4 and the above description, the operation of the metering valve will now be described. A user presses on the handle 20 of the metering valve 10 to initiate a flow of water. The stem 26 is moved down by the force on the handle. In a preferred embodiment, the downforce required to open the relief valve is less than five pounds for an input water supply pressure range of 0–100 pounds per square inch (p.s.i.) and a temperature range of 40° F.–140° F. When the stem moves down, the relief valve 42 opens. As shown in FIG. 4, the lower tapered portion 46 and reduced diameter section 49 of the stem 26 has moved into the damping chamber 72 and water can now flow up from the damping chamber, through annular opening 124 created between the relief valve seal 48 and the reduced diameter section 49 of the stem 26.

When the relief valve 42 is opened, the pressure in the damping chamber 72 drops momentarily to atmospheric pressure. Shortly afterwards, as water flows into the relief chamber 64 and to the aerator flow restrictor 128 on the faucet 12, the back pressure builds up to a level determined by the type of flow restrictor 128 used. The pressure drops because a flow of water passes from the relief chamber 64 through the openings 62 in the outer sleeve 50. The flow continues down the outer water passage 60, through the opening 66 in the cartridge cage 56, and out the water outlet 68 to the aerator flow restrictor 128. Any of a number of commonly available aerator flow restrictors may be used. Preferably, a flow restrictor that permits a flow rate of 0.5–2.5 gallons per minute (g.p.m.) at a water supply pressure level of 80 p.s.i. is used.

As the stem 26 is pushed down, the damping mechanism 44 is plunged toward the bottom of the damping chamber 72. The biasing member 98 compresses between the insert 90 and the contaminant chamber 100. The angled rim 94 of the V-cup folds towards the stem minimizing friction against the inner sleeve 70 due to the pressure differential created by the downward movement of the stem 26. As the pressure in the damping chamber drops, this pressure change is transmitted down the inner water channel 76 to the lower valve assembly 102. The drop in pressure above the lower valve assembly 102 allows the water supply pressure below the lower valve assembly to quickly push up and open the main valve. The diaphragm 106 flexes upwards and the seal 115 unseats from the annular diaphragm seat 114 on the diaphragm seat insert 112. Water can now flow from the inlet 14, through the filter 122, and out through the flow channels 118 into the water outlet 68.

As soon as the handle 20 is released, the metering valve 10 operates to slowly close the relief valve 42 and, upon the closing of the relief valve, quickly close the lower valve assembly to shut off water flow. The relief valve closes as the biasing member 98 pushes up against the damping mechanism 44 moving the tapered portion 46 of the stem 26 to its sealed position against the relief valve seal 48. The rate of the relief valve closure is primarily determined by the spring constant of the biasing member 98 and the size of the channel 96 inside the inner sleeve 70. Secondary variables affecting the rate of closure are water temperature and water pressure. The rate of closure, however, is preferably substantially independent of the temperature and pressure of the water supply. The total distance the stem needs to travel in order to return to an initial position will also affect overall time to close the relief valve. The metering valve may be preset to have a cycle time of approximately 10 seconds and may be adjustable to a cycle time of up to 25 seconds by adjusting a timing screw 126 attached to the handle 20. The timing screw 126 shortens or lengthens the stroke of the stem 26 and so sets an upper limit for the cycle time.

On the return stroke of the stem 26, the biasing member 98 presses against the damping mechanism. The angled rim 94 of the flexible member 92 expands against the inner diameter of the inner sleeve 70, due to the slight pressure differential between water above and below the v-cup, and brakes the upward movement of the stem. The channel 96 in the inner sleeve 70 lets water slowly flow from the upper portion of the damping chamber 72 to the portion of the damping chamber below the damping mechanism. In this way, the water bypassing the seal of the flexible member 92 against the inner sleeve permits movement of the stem. This movement is preferably substantially independent of water supply pressure and temperature.

While the relief valve 44 is open, and thus the lower valve assembly is open, water continuously moves from the water supply to the water outlet 68. In addition, water is constantly flowing through the pilot hole 105 while the lower valve assembly is open. The area of the pilot hole is preferably less than the area of the open relief valve 42 so that pressure cannot build up above the lower valve assembly, and thus close the lower valve assembly, until after the relief valve is substantially closed. Additionally, the area of the pilot hole 105 is preferably larger than the largest opening in the filter 122 so that contaminants in the water supply will not clog the pilot hole.

Once the biasing member 98, in cooperation with the channel 96 on the inner sleeve 70, has closed the relief valve 42, the pressure above the lower valve assembly 102 quickly increases until the valve 102 is closed and water flow ceases. Preferably the area of the diaphragm 106 and body 104 in contact with water above the lower valve assembly is greater than the area of the diaphragm and body in contact with water below the lower valve assembly so that the valve is held closed against the diaphragm seat insert when the pressure builds up through the pilot hole after the relief valve is closed.

An advantage of the presently preferred embodiment is that the amount of downforce necessary to begin a flow of water through the faucet is minimized. The stem and relief valve are not in contact with the lower valve assembly so that only a minimal force is necessary, due to the diameter of the stem, directly against the water supply pressure. Just as the downforce is minimized, so is the effect of water pressure on the closing time of the metering valve. A preferred embodiment of the present invention experiences less than a 1.25 pound increase in operating effort between a water pressure of 0 p.s.i. and 100 p.s.i. The channel and the damping mechanism dictate the speed at which the relief valve closes in combination with the biasing member. In one preferred embodiment, the channel 96 is a v-shaped groove with a width of 0.006 inches and a depth of 0.003 inches. A plurality of grooves positioned along the inside sleeve 70 may also be used in other preferred embodiments. The spring rate of one suitable biasing member may be 8.6 pounds per inch.

The timing of the valve closing and the effort of starting flow are also less affected by changes in the temperature of the water supply. The O-rings 38, 48 in contact with the stem are preferably EPDM rubber having a 70 durometer hardness. The O-rings are preferably small O-rings such as internally lubricated #6 O-rings with an inner diameter of 0.114 inches and a cross-sectional diameter of 0.070 inches. The stem is preferably 0.125 inches +/−0.001 inches in diameter with the reduced diameter section 49 having a diameter less than the inner diameter of the relief valve seal 48. The small diameters of the stem and O-rings minimize contact between the stem 26 and O-rings. In this way, the expansion and contraction of the O-rings is minimized when the temperature and pressure of the water supply changes. Because minimizing the area of contact between the stem and O-rings reduces the effect of pressure and temperature changes, the metering valve maintains a less variable operating force. Also, the small amount of O-ring surface area in contact with the stem lessens the effect of water pressure and temperature on the return stroke of the stem as the relief valve is closing.

An additional advantage of the presently preferred embodiment is its resistance to clogging and failure due to contaminants in the water supply. The relatively large pilot hole size reduces the chances that the particulates passing through the filter will clog the pilot hole 105. Further, particulates passing through the filter and pilot hole are easily handled by the damping mechanism. Any particulates that don't pass out the relief valve 42 will not likely be caught in the channel 96 as the damping mechanism moves along the inner surface of the inner sleeve 50. The flexible member 92, such as the illustrated V-cup, will flex to pass over particulates or accumulations of particulates. Also, particulates passing by the flexible member 92 into the bottom of the damping chamber 72 will not hinder the operation of the biasing member or damping mechanism because the contaminant chamber 100 is large enough to gather the particulates and keep them from interfering with the damping mechanism.

It is intended that the foregoing detailed description be regarded as illustrative rather than limiting, and that it be understood that the following claims, including all equivalents, are intended to define the scope of this invention.

What is claimed is:

1. A metering valve for use in sanitary applications comprising:
    a handle for receiving a force for actuating the metering valve;
    a relief valve assembly operatively connected to the handle, the relief valve assembly having a hydraulic damping mechanism for controllably closing the relief valve assembly after the handle receives the force; and
    a main valve assembly mounted over a water supply inlet independently of, and mechanically isolated from, the relief valve assembly and the handle, the main valve assembly in hydraulic communication with the relief valve assembly, wherein the relief valve assembly and the main valve assembly are configured for continuous hydraulic communication with water from the water supply inlet, and wherein the main valve assembly is exclusively hydraulically controllable by the relief valve assembly to close off a water flow from the water supply inlet.

2. The metering valve of claim 1, wherein the relief valve assembly further comprises a biasing member positioned to movably hold the relief valve assembly in a closed position and oppose the force for actuating the metering valve.

3. The metering of valve of claim 2, wherein the damping mechanism further comprises a damping chamber in fluid communication with the water supply via a pilot hole on the main valve assembly.

4. The metering valve of claim 3, further comprising a slidable central stem in contact with the handle and extending into the damping chamber.

5. The metering valve of claim 4, wherein the damping mechanism further comprises a damping member slidably movable in the damping chamber, the damping member coaxially mounted on the central stem.

6. The metering valve of claim 5, wherein the damping chamber is defined by an inner sleeve, the inner sleeve having an open end and a closed end, the inner sleeve further comprising a damping channel defined by a groove extending from the open end to the closed end on an interior circumference of the inner sleeve.

7. The metering valve of claim 6, wherein the damping member comprises a flexible annular ring, an exterior circumferential portion of the flexible ring slidably contacting the inner circumference of the inner sleeve.

8. The metering valve of claim 1, wherein the relief valve further comprises a relief valve channel, the relief valve channel defining a fluid path from the relief valve to a water outlet, whereby water from the damping chamber travels to the water outlet when the relief valve is on an open position.

9. The metering valve of claim 1, wherein the main valve assembly further comprises a main valve body having a pilot hole for passing water from the water supply inlet to the relief valve, and an annular main valve diaphragm attached at an inner diameter to the main valve body and attached at an outer diameter to a diaphragm seat.

10. The metering valve of claim 9, wherein the main valve is in a closed position when a water pressure in the damping chamber is equal to a water pressure at the water supply inlet.

11. The metering valve of claim 9, wherein the main valve assembly has a first surface area in contact with water at a water supply pressure from the water supply inlet and a second surface area on an opposite side of the main valve assembly, the first surface area being less than the second surface area, wherein the main valve is held in the closed position at a water pressure less than the water supply pressure.

12. A metering valve assembly for providing a timed flow of water from a water supply supplying water over a predetermined pressure range and a predetermined temperature range, the metering valve assembly comprising:
    a relief valve assembly operatively connected to a handle by a slidably mounted stem, the relief valve assembly having a sealing member forming a friction fit seal against the stem when the relief valve is in a closed position and forming a relief valve opening with the stem when the relief valve is in an open position;
    a hydraulic damping mechanism cooperatively connected to a biasing member and positioned adjacent to the relief valve assembly, the damping mechanism for controllably closing the relief valve assembly; and
    a lower valve assembly positioned over the water supply and mounted independently of, and mechanically isolated from, the relief valve assembly and the handle, the lower valve assembly in hydraulic communication with the relief valve assembly, wherein the relief valve assembly and the lower valve assembly are configured for continuous hydraulic communication with water from the water supply, and wherein the lower valve assembly is hydraulically controllable by the relief valve assembly to close off a water flow from the water supply inlet.

13. The metering valve assembly of claim 12, wherein the stem further comprises a first section having a first diameter and a second section having a diameter less than the first diameter, the relief valve opening having an area defined by the area between the sealing member and the second section of the stem.

14. The metering valve assembly of claim 13, wherein the sealing member is an O-ring.

15. The metering valve assembly of claim 12, wherein the lower valve assembly further comprises a main valve having a central portion mounted in a flexible member, the central portion having a pilot hole permitting water to pass through the lower valve assembly from the water supply to the relief valve, the pilot hole having an area less than an area of the relief valve opening.

16. The metering valve assembly of claim 15, wherein the flexible member comprises an annular diaphragm having a seal portion for removably covering a water supply inlet.

17. A method of actuating a metering valve comprising the steps of:
    providing a metering valve having a relief valve operatively connected to a handle and a main valve assembly covering a water supply inlet, the main valve assembly movably mounted inside the metering valve independently of, and mechanically isolated from, the handle and relief valve, the main valve having a first side covering the water supply inlet and a second side opposite the first side, the water supply inlet providing water at a predetermined water pressure to the relief valve and the main valve;

applying a downforce to the handle and transmitting the downforce from the handle to the relief valve;

opening the relief valve when the downforce reaches a predetermined threshold;

reducing water pressure on the second side of the main valve by channeling water through the opened relief valve;

opening the main valve when a force of the water supply pressure against the second side of the main valve becomes less than a force of the water supply pressure against the first side of the main valve, whereby water from the water supply flows from a water supply inlet to a faucet;

closing the relief valve with a force from a biasing member positioned to bias the relief valve in a closed position;

controlling a rate of closure of the relief valve with a hydraulic damping mechanism positioned adjacent to the biasing member, wherein the hydraulic dampening mechanism operates with water from the water supply inlet; and increasing a water pressure between the relief valve and main valve after the relief valve is substantially closed.

18. The method of claim 17 further comprising the steps of:

shutting off a flow of water from the water supply by closing the main valve assembly in response to the increased water pressure that builds up on the second side of the main valve assembly after the relief valve is substantially closed, whereby the relief valve is closed at a rate substantially independent of the water supply pressure and the rate is determined by the biasing member and damping mechanism.

19. The method of claim 18, wherein the damping mechanism further comprises a flexible damping member connected to the relief valve assembly and slidably mounted in a damping chamber, the flexible damping member contacting substantially all of an inner circumference of the damping chamber and the damping chamber having a channel allowing water to pass from a first end of the damping chamber to a second end of the damping chamber, wherein the step of controlling the rate of closure of the relief valve further comprises relieving a water pressure differential on opposite sides of the flexible damping member created by the biasing member by balancing the pressure in the damping chamber through the channel.

20. The method of claim 18, wherein the step of increasing a water pressure between the relief valve and metering valve after the relief valve is substantially closed comprises communicating a water pressure of the water supply with the water pressure of water between the relief valve and main valve through a pilot hole in the main valve assembly.

21. A metering valve for use in sanitary applications comprising:

a handle for receiving a force for actuating the metering valve;

a relief valve assembly operatively connected to the handle, the relief valve assembly having a hydraulic damping mechanism for controllably closing the relief valve assembly after the handle receives the force, the hydraulic damping mechanism comprising a fixed volume damping chamber; and a main valve assembly mounted over the water supply inlet independently of, and mechanically isolated from, the relief valve assembly and the handle, the main valve assembly in hydraulic communication with the relief valve assembly, wherein the relief valve assembly and the lower valve assembly are configured for continuous hydraulic communication with water from the water supply, and wherein the lower valve assembly is exclusively hydraulically controllable by the relief valve assembly to close off a water flow from the water supply inlet.

* * * * *